United States Patent
Synnestvedt et al.

(10) Patent No.: US 7,359,967 B1
(45) Date of Patent: Apr. 15, 2008

(54) SERVICE AND POLICY SYSTEM INTEGRITY MONITOR

(75) Inventors: Robert Glenn Synnestvedt, Palo Alto, CA (US); Tana Louise Franko, Santa Clara, CA (US)

(73) Assignee: Cisco Technology, inc., San Jose, CA (US)

( * ) Notice: Subject to any disclaimer, the term of this patent is extended or adjusted under 35 U.S.C. 154(b) by 450 days.

(21) Appl. No.: 10/285,887

(22) Filed: Nov. 1, 2002

(51) Int. Cl.
*G06F 15/173* (2006.01)
(52) U.S. Cl. .................................. 709/224
(58) Field of Classification Search ............. 709/217, 709/218, 219, 223, 224, 225; 710/39; 455/422.1; 713/201
See application file for complete search history.

(56) References Cited

U.S. PATENT DOCUMENTS

| | | | | |
|---|---|---|---|---|
| 6,658,465 B1 * | 12/2003 | Touboul | ....................... | 709/223 |
| 6,778,822 B1 * | 8/2004 | Visser et al. | .............. | 455/422.1 |
| 6,782,421 B1 * | 8/2004 | Soles et al. | .................. | 709/223 |
| 7,058,704 B1 * | 6/2006 | Mangipudi et al. | .......... | 709/223 |
| 2002/0078382 A1 * | 6/2002 | Sheikh et al. | ................ | 713/201 |
| 2003/0167180 A1 * | 9/2003 | Chung et al. | ................... | 705/1 |
| 2004/0153563 A1 * | 8/2004 | Shay et al. | .................. | 709/232 |

\* cited by examiner

*Primary Examiner*—Yves Dalencourt
(74) *Attorney, Agent, or Firm*—Marger Johnson & McCollom, P.C.

(57) ABSTRACT

A network device includes a port to connect the device to a policy system. The device includes a processor to trigger at least one call across the policy system, collect results of policy system operations, and compare the results with expected outcomes to create a metric. The device may also include a memory to store the metric for future reference.

18 Claims, 2 Drawing Sheets

SERVICE AND POLICY SYSTEM INTEGRITY MONITOR

BACKGROUND

1. Field

This disclosure relates to service and policy systems, more particularly to service and policy systems having integrity monitoring devices or processes.

2. Background

Wholesale network service and policy enforcement allow the wholesalers to more tightly control the parameters of their network. This allows the wholesaler to provide better service to its customers and to ensure its ability to meet service agreements with regards to levels of service, as well as provide more accurate accounting and tracking of usage. However, service and policy systems are increasing in complexity and scope. For ease of discussion, service and policy systems will be referred to here as policy systems.

Initially, policy enforcement may have been as simple as a set of operating system commands on a single Network Access Server (NAS) to handle resource pooling. In some instances policy enforcement has evolved into a distributed system of policy processors, Authentication, Authorization and Accounting (AAA) servers, reporting sub-systems, and RASER devices (Resource AAA SERvice). These policy systems have evolved into a network used to control moderate to large wholesale networks of hundreds to thousands of NASes and gateways.

As the complexity increases, the requirements of maintaining the policy system to keep it connected and accessible increase as well. These systems rely on being properly introduced into a service network, where all components are properly provisioned to maintain these connections and remain accessible to each other and the governed system. In one example, a centralized database is used as a reference point for all of the elements that have been introduced into the system. However, the elements such as the gateways that are part of the governed system do not register in the common database, so there is not a common registration point.

Furthermore, even if there were basic connectivity and a common registry, a system component may have been installed with improper permissions privileges or firewall access or other blockades to end-to-end system integrity. It would be useful to provide an adjunct to policy systems that could be used to monitor the end-to-end system connectivity and integrity for controlling the larger wholesale network.

SUMMARY

One embodiment of the invention is a network device. The device includes a port to connect the device to a policy system. The device includes a processor to trigger at least one call across the policy system, collect results of policy system operations, and compare the results with expected outcomes to create a metric. The device may also include a memory to store the metric for future reference.

Another embodiment of the invention is a method of monitoring a policy system. The method comprises triggering at least one call into a policy system. The method collects the results of the policy system operations and compares the results to an expected outcome and generates a metric.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
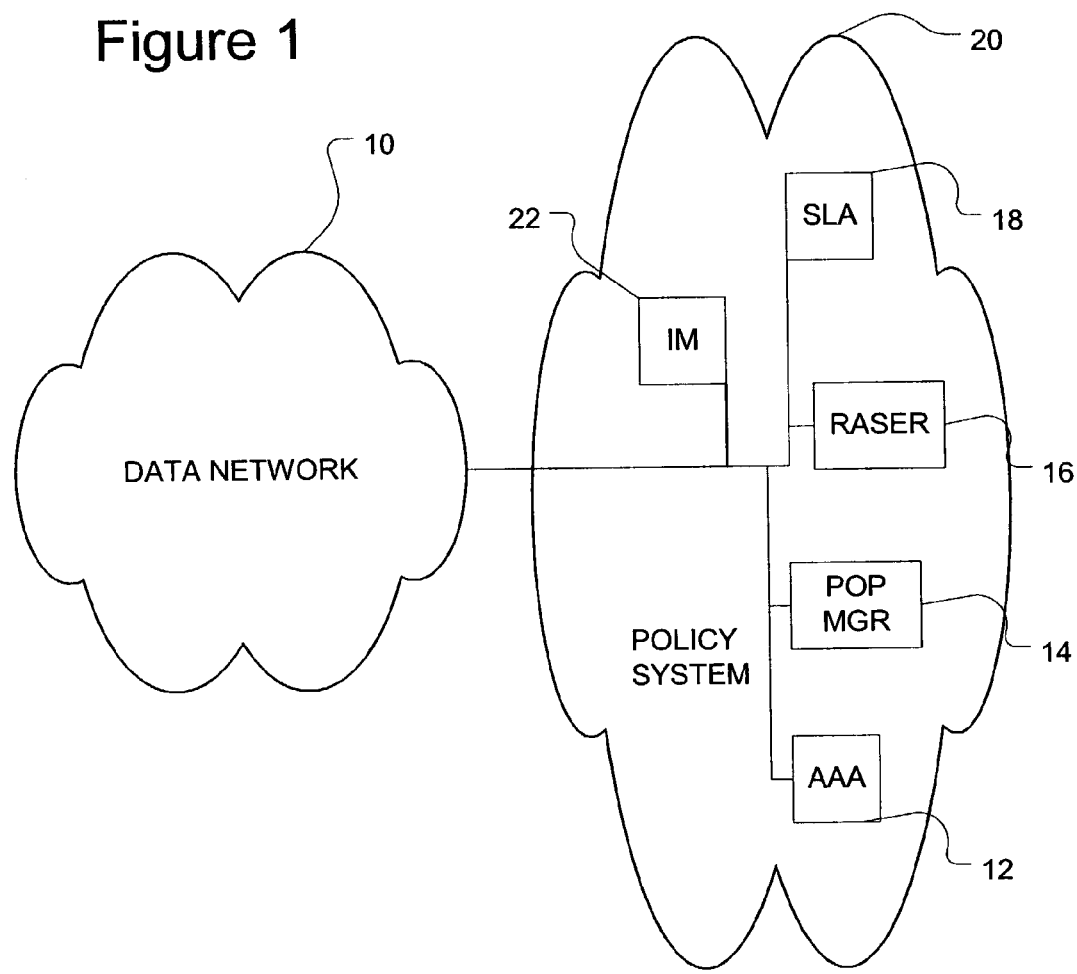
FIG. 1 shows a policy system to govern a wholesale network, wherein the policy system includes an integrity monitor.

FIG. 1 shows an example of a data network 10 being monitored by a policy system 20. The policy system may include one or more Service Level Agreement (SLA) servers 18, RASERs (Remote Access Service Routers, or Remote Access SERvers) 16, point-of-presence (POP) Servers 14, and Authentication, Authorization and Accounting (AAA) servers 12.

The policy system works to enforce and record resource usage and SLA contracts between a wholesale network provider and its customers, typically Internet or other network Service Providers. The policy system works as a service level call controller tracking ISP sessions, service and port usage. It may also function as a call controller, participating in call set up requests before resources are allocated to handle the call. This last is often referred to as 'pre-authentication' call control.

The policy system 20 leverages a set of Remote Authentication Dial-In User Services (RADIUS) attributes to associate a call with a particular SLA and customer policy. Voice over Internet Protocol (VoIP) calls can also be associated with various policies using H.323 Gatekeepers and Session Initiation Protocol proxy servers. When a data network includes both dial and VoIP calls, it may be referred to here as an Any Service Any Port (ASAP) network.

The policy system 20 governs the call control and tracking of the data network 10. For example, an SLA server handles SLA enforcement for multiple customers or for a single customer. A POP manager enforces specific POP limits per customer or per region. For instance, the wholesaler may have POPs in Los Angeles and Seattle that are both available to a given customer. There may be one SLA server for the customer, but two POP managers, one for LA and one for Seattle, each enforcing the POP shared overflow pool limits. RASERs are high-speed, stateless RADIUS software switching or routing components used to route RADIUS call control messages between various call and service controllers. The POP managers and SL servers are policy processors and may run on separate devices or on a single RASER host.

However, when all of these devices are provisioned to run on separate devices, there may not be a central registration point for them. Similarly, each of the devices may be provided from different vendors, may not be properly introduced into a service network, with the correct permissions and firewall access, etc. Elements on the data network, such as the network access servers, also need to be correctly provisions to properly access and interoperate with the policy system. Lack of this interoperability would prevent the policy system from functioning correctly.

As shown in FIG. 1, an Integrity Monitor (IM) 22 has been added to the policy system. The IM 22 would characterize the network and ensure that all of the components are functioning correctly and able to communicate the necessary information between them. The IM would also 'load' the system, to simulate or stimulate calls across the policy system to determine the results of the calls. Simulation of a call will refer to any signal that causes the policy system to react, but is not a call actually placed on the system, such as before the policy system is deployed. Stimulation will refer to any process that causes an actual call to be generated across the policy system, whether that call is in the pre-deployment phase, or during actual operation.

Simulation may occur during the initialization of the policy system before deployment, or during actual operation for troubleshooting or characterizing the system. During simulation, the IM would be simulating the types of messages that would otherwise come from elements in the wholesale data network, without actually using the whole-sale network.

Stimulation involves the IM triggers calls using the devices in the wholesale network. The IM would actually dial into a NAS to initiate a call through the NAS into the wholesale network. As mentioned previously, elements on the wholesale network need to be provisioned to properly access and interoperate with the policy system. This would actually allow the IM to check the integrity of elements of the wholesale network as well. Elements of the wholesale network may be even more likely to be a mixture of vendors and solutions and would not register in a common service system database or otherwise provide any simple means of end-to-end integrity monitoring.

Figure 2:
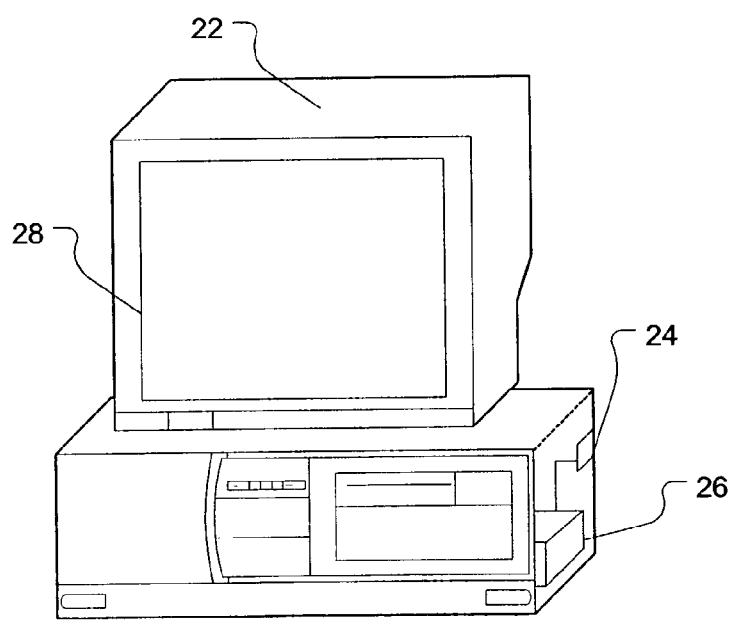
FIG. 2 shows a block diagram of an embodiment of an integrity monitor.

In FIG. 2, the IM is shown in more detail. The IM would more than likely be a personal computer or workstation attached to the policy system, upon which would run the processes to test and monitor policy system integrity. An article of computer-readable media would contain computer-readable code that, when executed, would cause the computer to execute the processes of the invention.

The IM 22 would have a port 24 that allows it to connect to the policy system, and a processor 26. The processor 26 would trigger a call to occur in the policy system, collect data on the operations of the policy system, and compare the data with an expected outcome. The processor would then generate a metric to indicate the results of the comparison. As indicated above, triggering a call may involve triggering a call by dialing into an element on the wholesale network, for example, thereby stimulating a call, or it may involve the IM simulating a call, where the wholesale network is not involved.

The integrity monitor 22 may include a user interface that indicates the results of the comparison. The user interface could be anything that indicates the results, such as a simple 'green' LED (light emitting diode), or as elaborate as a display, such as that show in FIG. 2 at 28. However, this is optional, as the integrity monitor may provide the results to a user, such as a system administrator, in another manner, such as transmitting the results to a printer or another network device on the policy system. Similarly, the integrity monitor may include a memory, not shown, to allow storing of the metric for future comparisons or historical tracking of results.

Figure 3:
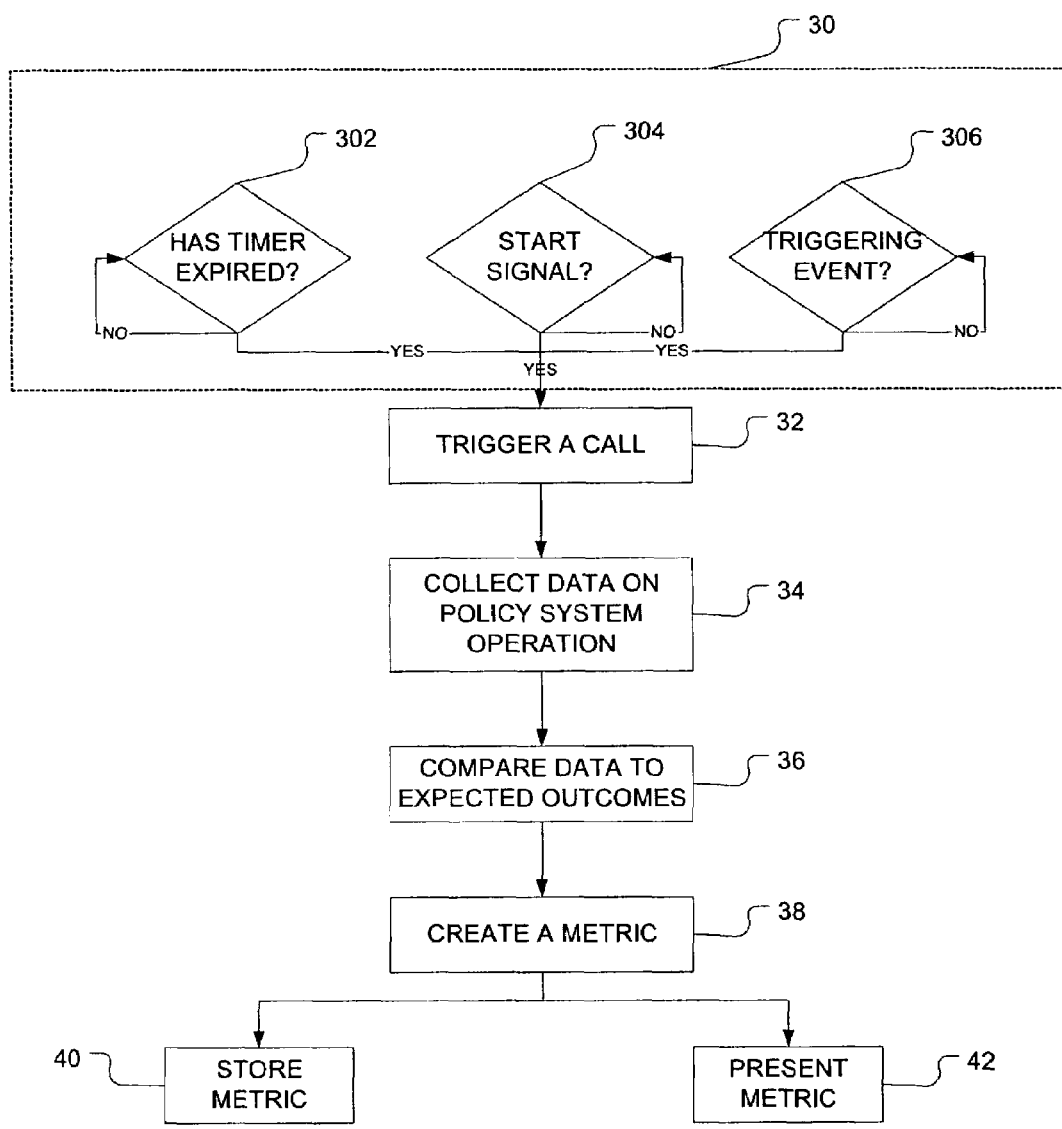
FIG. 3 shows a flow chart of an embodiment of a method to monitor policy system integrity.

One embodiment of the process of monitoring the policy system is shown in flowchart form in FIG. 3. Several different occurrences 30 could trigger the start of the process. For example, the process could start automatically, such as at pre-defined intervals. A timer may be set to define an interval, and then when the timer expires at 302, the monitor process begins. Similarly, a manual event could cause the process to start, such as a user pressing a 'start' button or launching the process in some other manner. The manual launching of this process will be referred to as a start signal, as shown at 304. Additionally, the process may begin with a triggering event at 306, such as a certain call level being reached, a new device being introduced into the system, a change in policy constraints, etc.

Regardless of how the process is started, the process then triggers a call in the policy system at 32. The call may be an actual call placed in an operational policy system or a simulated call placed in a policy system prior to its deployment. At least one call will be generated, but multiple calls may be as well. For instance, a system or an element within the system may be loaded with multiple calls and the response of the system or element would be characterized. At 34, data is collected on the operation of the policy system. This data is then compared to the expected outcomes at 36. An expected outcome may be that the call or calls are handled by a certain subset of components of the policy system, or that the components communicated certain information between themselves with regards to the call or calls, as examples.

The comparison will result creation of a metric that indicates whether the system or element is functioning as expected or not at 38. The metric may be communicated to a user, such as a system administrator, at 42, and/or stored at 40. Storage of the metric may allow further comparisons, such as historical performance comparisons, etc.

In this manner, the integrity of the policy system can be monitored and measured to ensure that the policy system is functioning correctly. The policy system plays an important role for wholesale network providers, so the integrity of that system must be maintained. If the system does not 'pass' the comparison, adjustments can be made and the wholesale network provider can once again rely upon the data collected and policies enforced by the policy system.

Thus, although there has been described to this point a particular embodiment for a method and apparatus for integrity monitoring of a policy system, it is not intended that such specific references be considered as limitations upon the scope of this invention except in-so-far as set forth in the following claims.

What is claimed is:

1. A network device, comprising:
   a port operable to connect the device to a policy system;
   a processor to:
   trigger at least one call across the policy system to cause the policy system to associate the call with a service level agreement and customer policy and to enforce policies with regard to the agreement and the policy;
   collect results of policy system operations;
   compare the results with expected outcomes to create a metric of policy system operations;
   a memory to store the metric; and
   wherein trigger at least one call across the policy system comprises one of either generating a simulation signal to mimic the call in the policy system or stimulating the call into the policy system.

2. The network device of claim 1, wherein the network device further comprises a personal computer.

3. The network device of claim 1, wherein the network device further comprises a workstation.

4. The network device of claim 1, wherein the processor is further to present the metric to a user.

5. The network device of claim 1, wherein the device further comprises a user interface to present the metric to a user.

6. A method of monitoring a policy system, the method comprising:
triggering at least one call in a policy system to cause the policy system to associate the call with a service level agreement and customer policy and to enforce policies with regard to the agreement and the policy;
collecting data on policy systems operations;
comparing the data with expected outcomes;
creating a metric;
storing the metric; and
wherein triggering at least one call in the policy system comprises one of either generating a simulation signal to mimic the call in the policy system or stimulating the call into the policy system.

7. The method of claim 6, wherein the method further comprises presenting the metric to an administrator.

8. The method of claim 6, wherein triggering at least one call occurs automatically.

9. The method of claim 6, wherein triggering at least one call occurs manually.

10. The method of claim 6, wherein triggering at least one call is caused by an event.

11. The method of claim 6, wherein triggering at least one call further comprises triggering multiple calls.

12. A network device, comprising:
a means for connecting the device to a policy system;
a means for:
triggering a call across the policy system to cause the policy system to associate the call with a service level agreement and customer policy and to enforce policies with regard to the agreement and the policy;
collecting results of policy system operations;
comparing the results with expected outcomes;
creating a metric;
a means for storing the metric; and
wherein triggering a call across the policy system comprises one of either a means for generating a simulation signal to mimic the call in the policy system or stimulating the call into the policy system.

13. The network device of claim 12, wherein the network device further comprises a personal computer.

14. The network device of claim 12, wherein the network device further comprises a workstation.

15. The network device of claim 12, further comprising means for presenting the metric to a user.

16. The network device of claim 12, wherein the network device further comprises a means for allowing a user interface.

17. An article of computer-readable storage media containing computer-readable code that, when executed, causes a computer to:
trigger at least one call to occur in a policy system to cause the policy system to associate the call with a service level agreement and customer policy and to enforce policies with regard to the agreement and the policy;
collect results of policy systems operations;
compare the results with expected outcomes to create a metric;
store the metric; and
wherein trigger at least one call to occur in the policy system comprises one of either generating a simulation signal to mimic the call in the policy system or stimulating the call into the policy system.

18. The article of computer-readable storage media of claim 17, wherein the computer-readable code further causes the computer to present the metric to an administrator.

* * * * *